N. PALMER.
Thrashing Machine.
No. 60,928. Patented Jan. 1, 1867.
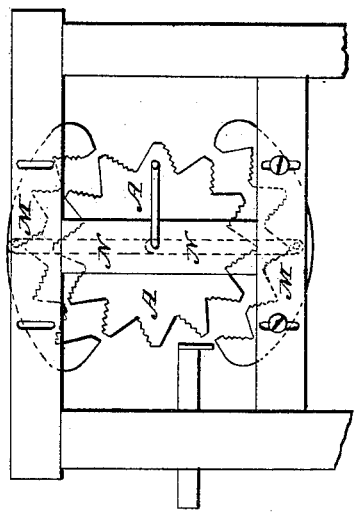
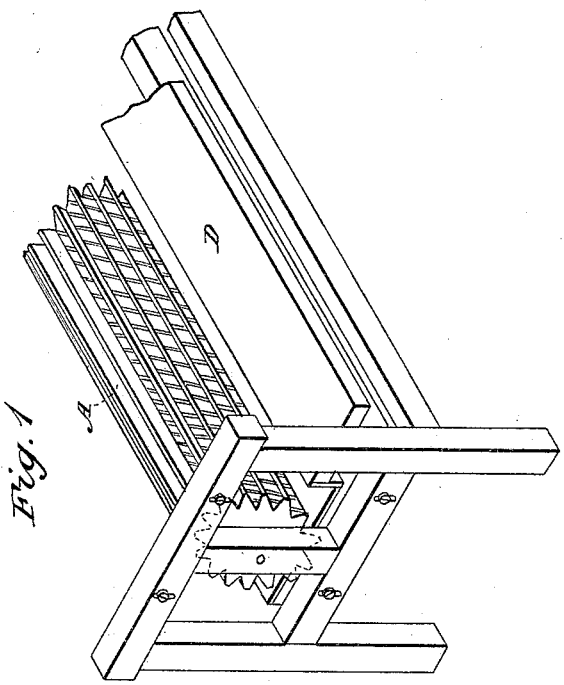
Witnesses:
 C. F. Clausen.
 L. A. Murphy
Inventor:
 Nelson Palmer
 by
 D. P. Holloway & Co.
 his Atty

United States Patent Office.

NELSON PALMER, OF HUDSON, ASSIGNOR TO HIMSELF AND T. G. PALMER, OF SCHULTZVILLE, NEW YORK.

Letters Patent No. 60,928, dated January 1, 1867.

IMPROVEMENT IN THRESHING MACHINES.

*The Schedule referred to in these Letters Patent and making part of the same.*

TO ALL WHOM IT MAY CONCERN:

Be it known that I, NELSON PALMER, of Hudson, in the county of Columbia, and State of New York, have invented a new and useful Improvement in Threshing Machines; and I do hereby declare that the following is a full, clear, and exact description of the same, reference being had to the annexed drawings, making part of this specification, in which—

Figure 1 is a perspective view; and

Figure 2 is a vertical transverse section.

The same letters are employed in the indication of identical parts in the several figures.

I have filed with this application another in which I have shown two concaves and alluded to a variation in construction not made the subject of distinct claim, the object of that application being to cover the principle involved in the improvements I have made, viz, providing for rough or smooth threshing by a cylinder which, revolving in one direction, shall present smooth ribs to smooth ribs on the concave, and revolving in the other shall present rough ribs to rough ribs on the concave. In that application and specification I have shown two concaves disposed upon opposite sides of the threshing cylinder. The longitudinal ribs upon the threshing cylinder are constructed with two faces, one smooth the other roughened. The concaves are similarly provided, one with smooth ribs, the other with roughened ribs, against which, alternatively, the correspondingly smooth or roughened ribs of the cylinder press the straw, the sides to be used being determined by the condition of the grain to be threshed. Instead of the two concaves mentioned in the other specification I here present a single adjustable concave, M, which is shown as suspended upon stirrups N, attached at the middle of the concave and near or around the journal of the threshing cylinder, so that it may be swung from one side to the other of the threshing cylinder and there held in place by bolts or other suitable device. Though I have shown the concave as swinging upon straps or stirrups N, this is not an essential feature of my invention, which consists in making the concave adjustable so that it may be moved from one part to another, and placed as desired on one or the other side of the threshing cylinder. The cylinder is made as already indicated, and as more fully described in the other specification, to which reference is made for more certain description. The concave is similarly formed with longitudinal ribs like those of the threshing cylinder, being smooth upon one side and roughened upon the other in such manner that the straw shall, as the cylinder revolves in one direction, be pressed against the smooth face of the ribs on both the cylinder and the concave, and when revolving in the reverse direction against the roughened face of the ribs on both. I do not limit my claim to the precise mode of constructing and arranging the adjustable concave, for these may be varied; nor to an adjustable concave in combination with a cylinder of the precise construction set forth, for the construction of the cylinder may be varied without destroying the purpose of my invention, though I think I have set forth the best construction.

What I claim as my invention, and desire to secure by Letters Patent, is—

A concave so connected with a threshing machine that it may be adjustably placed on one side or the other of the threshing cylinder, for varying the character of the work, substantially as set forth.

In testimony whereof I have signed my name to this specification in the presence of two subscribing witnesses.

NELSON PALMER.

Witnesses:
D. P. HOLLOWAY,
T. G. PALMER.